US006222002B1

(12) United States Patent
Chaudhari et al.

(10) Patent No.: US 6,222,002 B1
(45) Date of Patent: Apr. 24, 2001

(54) METHOD FOR PREPARING POLYCARBONATES BY OXIDATIVE CARBONYLATION

(75) Inventors: Raghunath Vitthal Chaudhari, Pune (IN); Ashutosh Anant Kelkar, Schenectady, NY (US); Sunil Purushottam Gupte, Pune (IN); Bhalchandra Mahadeo Bhanage, Pune (IN); Mohammed Shadbar Qureshi, Pune (IN); Bahram Moasser, Schenectady; Eric James Pressman, East Greenbush, both of NY (US); Swaminathan Sivaram, Pune (IN); Chilukuri Ver Avadhani, Pune (IN); Subbareddiar Kanagasabapathy, Pune (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/378,116

(22) Filed: Aug. 20, 1999

(51) Int. Cl.$^7$ .................................................. C08G 64/00
(52) U.S. Cl. ........................................... 528/196; 528/198
(58) Field of Search ..................................... 528/196, 198

(56) References Cited

U.S. PATENT DOCUMENTS

| 4,096,168 | 6/1978 | Hallgren | 528/196 |
| 4,096,169 | 6/1978 | Chalk | 528/196 |
| 4,201,721 | 5/1980 | Hallgren | 528/219 |
| 4,948,871 | 8/1990 | Fukuoka et al. | 528/481 |
| 5,204,377 | 4/1993 | Fukawa et al. | 521/60 |
| 5,231,210 | 7/1993 | Joyce et al. | 558/274 |
| 5,284,964 | 2/1994 | Pressman et al. | 558/260 |
| 5,717,056 | 2/1998 | Varadarajan et al. | 528/196 |
| 5,898,079 | 1/1999 | Pressman et al. | 528/274 |

FOREIGN PATENT DOCUMENTS

| 350697A2 | 1/1990 | (EP) . |
| 350700A2 | 1/1990 | (EP) . |
| 2137704 | 12/1972 | (FR) . |
| 1578713 | 11/1980 | (GB) . |

OTHER PUBLICATIONS

"Direct Formation of Polycarbonates by Oxidative Carbonylation of Bisphenol A", by M. Goyal et al., Polymer Preprints, 39, 589–590 (1998).

*Primary Examiner*—Terressa M. Boykin
(74) *Attorney, Agent, or Firm*—Noreen C. Johnson; Douglas E. Stoner

(57) ABSTRACT

Polycarbonate oligomers are prepared by oxidative carbonylation of a dihydroxyaromatic compound such as bisphenol A in the presence of a catalyst comprising a Group VIII metal such as palladium, an inorganic and/or an organic co-catalyst, a halide source and an alcohol-free solvent comprising at least one liquid aromatic hydrocarbon, optionally in combination with a dipolar aprotic liquid such as N-methylpyrrolidinone. These oligomers may be further polymerized by melt polymerization to precursor polycarbonate oligomers which may be converted to high molecular weight polycarbonates by melt or solid state polymerization.

29 Claims, No Drawings

METHOD FOR PREPARING POLYCARBONATES BY OXIDATIVE CARBONYLATION

BACKGROUND OF THE INVENTION

This invention relates to the preparation of polycarbonates, and more particularly their preparation by oxidative carbonylation followed by solid state polymerization.

Solid state polymerization (SSP) as a method for preparing polycarbonates is disclosed, for example, in U.S. Pat. Nos. 4,948,871, 5,204,377 and 5,717,056. Use of this method is of increasing interest by reason of its effectiveness and environmental benefits. It is typically described as involving three steps, of which the first step is the formation of a precursor polycarbonate, often an oligomer, typically by a reaction such as melt polymerization (i.e., transesterification) of a dihydroxyaromatic compound such as 2,2-bis(4-hydroxyphenyl)propane (bisphenol A) with a diaryl carbonate such as diphenyl carbonate. The second step is enhancement of the crystallinity of the precursor polycarbonate, and the third step is the building of molecular weight by heating the enhanced crystallinity precursor polycarbonate to a temperature between its glass transition temperature and its melting temperature.

Other methods of polycarbonate oligomer preparation are known. They include the oxidative carbonylation (hereinafter sometimes simply "carbonylation" for brevity) of a dihydroxyaromatic compound; i.e., its reaction with carbon monoxide and oxygen in the presence of a compound of a Group VIII element with an atomic number of at least 44, preferably palladium.

The carbonylation of both mono- and dihydroxyaromatic compounds by this method is disclosed, for example, in U.S. Pat. Nos. 4,096,168, 4,096,169 and 4,201,721. Further developments, of particular applicability to monohydroxyaromatic compounds, are the use of co-catalysts which may include an inorganic co-catalyst which is a cobalt compound, especially a complex with a pentadentate ligand, as illustrated by the cobalt(II) salt of bis[3-(salicylalamino)-propyl]methylamine, said complex hereinafter being designated "CoSMDPT"; and an organic co-catalyst, most often a terpyridine such as 2,2':6',2"-terpyridine. Reference is made, for example, to U.S. Pat. Nos. 5,231,210 and 5,284,964.

A still further catalyst constituent which is advantageously present for carbonylation of hydroxyaromatic compounds is a bromide (preferably) or chloride source, most often quaternary ammonium, quaternary phosphonium or hexaalkylguanidinium salt such as tetra-n-butylammonium bromide or hexaethylguanidinium chloride or bromide. The aforementioned U.S. Pat. Nos. 5,231,210 and 5,284,964 disclose the use of quater nary ammonium and phosphonium halides, and the similar use of cuanidinium halides is disclosed, for example, in copending, commonly owned application Ser. No. 08/929,000. The disclosures of all of the aforementioned patents and application are incorporated by reference herein.

Polycarbonate oligomers prepared by carbonylation are characterized by hydroxy end groups. Such oligomers are not generally suitable as such for SSP since their molecular weights are, for t he most part, too low, as exemplified by intrinsic viscosities (IV, in chloroform at 25° C.) below about 0.10 and glass transition temperatures (Tg) below 100° C.

They also have other disadvantages. In the first place, an essentially stoichiometric proportion of the expensive palladium compound is usually required for their preparation. In the second place, oligomer production is often low even when a stoichiometric proportion of palladium is employed, whether calculated in terms of percent yield based on dihydroxyaromatic compound or on "turnover number", the number of moles of carbonate units formed per gram-atom of palladium. In the third place, excessive reaction times on the order of 15 hours are frequently necessary.

The conventional second step of the SSP process, crystallinity enhancement, is considered essential in accordance with the aforementioned prior art. As taught, for example, in the aforementioned U.S. Pat. No. 4,948,871, the crystallinity of the precursor polycarbonate should be in the range of about 5–55% as determined, for example, from powder X-ray diffraction patterns. If it is below 5%, the melting point of the precursor polycarbonate is so low that melting rather than SSP may occur. On the other hand, at crystallinity levels greater than 55% the rate of the molecular weight building step is too low to be practical.

Crystallinity enhancement may be performed by several methods. These include heat treatment, solvent or non-solvent treatment, contact with crystallization promoters and treatment with swelling agents. Each of these methods requires time input and/or treatment with extraneous chemicals which must be kept in inventory and stored. It would be desirable, therefore, to develop an overall polymerization method, including a final SSP step, in which the precursor polycarbonate is inherently of sufficient crystallinity to make a separate crystallinity enhancement step unnecessary.

SUMMARY OF THE INVENTION

The present invention includes an improved method for carbonylation of dihydroxyaromatic compounds, wherein the reactant containing a metal such as palladium is employed in essentially catalytic rather than stoichiometric proportions in the presence of a specifically defined solvent system. Also included is a polymerization method for the oligomeric carbonylation product which includes as a final step either melt polymerization or SSP, in the latter of which the polycarbonate oligomers initially prepared may have a sufficient degree of inherent crystallinity so that no crystallinity enhancement step is required before SSP can be conducted. On the other hand, if there is not a sufficient degree of crystallinity, then the crystallinity needs to be induced by methods know to one skilled in the art.

A first aspect of the invention is a method for preparing a polycarbonate oligomer composition which comprises contacting at least one dihydroxyaromatic compound with oxygen and carbon monoxide in the presence of an amount effective for carbonylation of at least one catalyst composition comprising:

a Group VIII metal having an atomic number of at least 44, or a compound thereof;

at least one organic or inorganic co-catalyst;

at least one halide source; and an alcohol-free solvent comprising at least one liquid aromatic hydrocarbon.

A second aspect is a catalyst composition comprising a Group VIII metal, co-catalyst, halide source and alcohol-free solvent as defined above.

A third aspect is a method for preparing a high molecular weight aromatic polycarbonate which comprises:

(A) preparing at least one carbonylation oligomer by oxidative carbonylation of at least one dihydroxyaromatic compound, (B) converting said carbonylation oligomer to a precursor polycarbonate oligomer by melt polymerization in the presence of at least one diaryl carbonate, and (C) polymerizing said precursor polycarbonate oligomer to a high molecular weight polycarbonate by melt polymerization or solid state polymerization.

In particular, the invention includes such a method wherein step C is an SSP step and steps B and C follow step A without an intervening step of crystallinity enhancement, provided there is a sufficient degree of inherent crystallinity.

DETAILED DESCRIPTION; PREFERRED EMBODIMENTS

Polycarbonates which may be prepared by the method of the first aspect of this invention typically comprise structural units of the formula

(I)

wherein each $A^1$ is independently an aromatic organic radical. Preferably, each $A^1$ is a radical of the formula $$-A^2-Y-A^3-\qquad(II)$$

wherein each $A^2$ and $A^3$ is a monocyclic divalent aryl radical and Y is a bridging radical in which one or two carbonate atoms separate $A^2$ and $A^3$. Such radicals are derived from dihydroxyaromatic compounds of the formula HO—R—OH and bisphenols of the formula HO—$A^2$—Y—$A^3$—OH, respectively. For example, $A^2$ and $A^3$ generally represent unsubstituted phenylene, especially p-phenylene which is preferred, or substituted derivatives thereof. The bridging radical Y is most often a hydrocarbon group and particularly a saturated group such as methylene, cyclohexylidene, or isopropylidene which is preferred. Thus, the most preferred polycarbonates are those derived entirely or in part from 2,2-bis(4-hydroxyphenyl)propane, also known as "bisphenol A".

The first aspect of the invention is a carbonylation reaction for preparing polycarbonate oligomers, the singular and plural forms of "oligomer" frequently being used interchangeably herein to designate compositions which may contain a single oligomer of specific molecular weight or, more often, a mixture of oligomers containing the same structural unit(s) but having varying molecular weights. Said method is characterized by the use of the specifically defined catalyst composition of the second aspect thereof. Said composition includes, first, a metal selected from the group consisting of ruthenium, rhodium, palladium, osmium, iridium and platinum, or a compound thereof. Palladium is the preferred metal. Thus, palladium black or elemental palladium deposited on carbon are particularly suitable, as are palladium compounds such as halides, nitrates, carboxylates and complexes involving such compounds as carbon monoxide, amines, phosphines or olefins. Especially preferred in most instances are palladium(II) salts of organic acids, most often $C_{2-6}$ aliphatic carboxylic acids, and palladium(II) salts of β-diketones. Palladium(II) acetate and palladium(II) 2,4-pentanedionate are generally most preferred.

Also present as part of the catalyst composition is at least one organic or inorganic co-catalyst. Most often, both of at least one of an inorganic and at least one of an organic co-catalyst are present.

Inorganic co-catalysts include divalent or trivalent manganese halide or carboxylate salts, or amine, diketone, or carbon monoxide complexes; or cobalt (II) halide or carboxylate salts, or amine, diketone, or carbon monoxide complexes, e.g., cobalt chloride and cobalt acetate. One genus of preferred inorganic co-catalysts includes compounds of the type disclosed in the aforementioned U.S. Pat. No. 5,231,210; namely, complexes of cobalt(II) salts with organic compounds capable of forming complexes, especially pentadentate complexes, therewith. Illustrative organic compounds of this type are nitrogen-containing heterocyclic compounds including pyridines, bipyridines, terpyridines, quinolines, isoquinolines and biquinolines; aliphatic polyamines such as ethylenediamine and tetraalkylethylenediamines, such as tetramethylethylenediamine; crown ethers; aliphatic ethers; aromatic or aliphatic amine ethers such as cryptands; and Schiff bases. The especially preferred inorganic co-catalyst is CoSMDPT as defined hereinabove.

It is also within the scope of the invention to employ as an inorganic co-catalyst constituent a lead compound. Suitable lead compounds include the oxides, such as PbO, $Pb_3O_4$, $PbO_2$ and the like; carboxylates (e.g., formates, acetates, propionates, oxalates); lead compounds generally represented by the formula $Pb(OR)_2$, wherein R is an alkyl or aryl group, for example $Pb(OCH_3)_2$, $Pb(OC_6H_6)_2$; nitrates, and sulfates, as well as lead-containing complexes, such as phthalocyanine lead.

Organic co-catalysts which may be employed include, for example, quinones and aromatic diols formed by the reduction of said quinones, or a mixture thereof. 1,4-Benzoquinone and hydroquinone have been found to be effective, as well as compounds such as 1,2-quinone and catechol, anthraquinone, 9,10-dihydroxy anthracene, and phenanthraquinone. Aromatic organic amines are preferred, for example, terpyridine, phenanthroline, quinoline and isoquinoline compounds including 2,2':6',2"-terpyridine, 4'-methylthio-2,2':6',2"-terpyridine and 2,2':6',2"-terpyridine N-oxide, 1,10-phenanthroline, 2,4,7,8-tetramethyl-1,10-phenanthroline, 4,7-diphenyl-1,10-phenanthroline and 3,4,7,8-tetramethyl-1,10-phenanthroline. The terpyridines and especially 2,2':6',2"-terpyridine are generally preferred.

The catalyst composition also contains at least one halide source. Suitable halide sources include quaternary ammonium halides and quaternary phosphonium halides represented by the following formula:

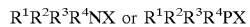

wherein $R^1$, $R^2$, $R^3$, and $R^4$ are each independently an alkyl group or aryl group, each group independently having a carbon number of 1 to about 24, and X is halogen, especially chloride or bromide. Bromides are preferred, for example tetra-n-butylammonium bromide, tetraphenylphosphonium bromide and the like. Other suitable halide sources include hexaalkylguanidinium halides, particularly hexaalkylguanidinium chlorides or bromides. The guanidinium salts are often preferred; they include the α,ω-bis (pentaalkyl-guanidiniun)alkane salts. Salts in which the alkyl groups contain 2–6 carbon atoms are especially preferred, with hexaethylguanidinium bromide being most preferred. Mixtures of halide sources may also be used.

Finally, the catalyst composition includes a solvent comprising at least one liquid aromatic hydrocarbon. By "liquid" is meant a material which is liquid under ambient conditions, particularly atmospheric pressure and a temperature in the range of about 20–30° C. Suitable aromatic hydrocarbons include benzene, toluene and the isomeric xylenes. They may be present as single compounds or as mixtures; e.g., an isomeric xylene mixture or a mixture of toluene with one or more xylenes. Within the context of the present invention liquid aromatic hydrocarbons include halogenated aromatic hydrocarbons, including chlorobenzene, dichlorobenzene, trichlorobenzene, and the like. Mixtures of aromatic hydrocarbons are also suitable for use in the present invention.

Another feature of the solvent system for the catalyst composition is that it is alcohol-free. In the context of the present invention alcohol encompasses normal and branched aliphatic alcohols, including methanol and ethanol, and cycloaliphatic alcohols, including cyclohexanol. The advantage of employing an alcohol-free aromatic hydrocarbon constituent is demonstrated by comparison with similar systems additionally containing methanol in the amount of 27.7% by volume, based on total solvent. The presence of the methanol caused the formation of methanol-soluble carbonate products of very low molecular weight, unsuitable for conversion to high molecular weight polycarbonate. On the other hand, in the absence of alcohols an oligomeric product having a weight average molecular weight in the range of 1,500–2,500, readily convertible to high molecular weight polycarbonate, is typically obtained.

In a preferred embodiment of the invention, the solvent system contains a dipolar aprotic liquid in addition to the aromatic hydrocarbon. Dipolar aprotic liquids are an art-recognized class of compounds of which examples are dimethylformamide, dimethylacetamide, dimethyl sulfoxide and N-methylpyrrolidinone (hereinafter sometimes "NMP"). It is often preferred to employ NMP since its use affords polycarbonate oligomer in improved yield and increases catalyst turnover, as defined hereinafter.

The proportion of Group VIII metal source employed is typically in the range of about 5–800, preferably about 5–100, ppm by weight of metal, based on hydroxyaromatic compound. For each mole of Group VIII metal there is usually employed about 0.1–5.0 and especially about 0.5–1.5 moles of inorganic co-catalyst, about 0.1–3.0 and preferably about 0.2–1.0 moles of organic co-catalyst and about 2–150, preferably about 5–40, moles of halide source.

Solvent is most often present in the amount of about 5–20 ml per gram of dihydroxyaromatic compound. When the solvent includes a dipolar aprotic liquid, it ordinarily comprises about 5–25% by volume of total solvent.

Gas is supplied to the reaction mixture in proportions of about 2–50 mole percent oxygen, with the balance being carbon monoxide. The gases may be introduced separately or as a mixture, to a total pressure in the range of about 10–250 atmospheres. Reaction temperatures in the range of about 60–150° C. are typical. Drying agents, typically molecular sieves, are preferably present in the reaction vessel since their presence can substantially increase product yield. In order for the reaction to be as rapid as possible, it is preferred to maintain the reaction pressure in accordance with the aforementioned U.S. Pat. No. 5,399,734 until conversion of the dihydroxyaromatic compound is complete.

In step A of the method of the third aspect of the invention, at least one carbonylation oligomer, most often a mixture of oligomers of varying molecular weights, is prepared by carbonylation. This reaction may be conducted as described in the prior art, with particular reference to the aforementioned U.S. Pat. Nos. 4,096,168, 4,096,169 and 4,201,721. It is preferred, however, to employ the method of the first aspect of the present invention for preparation of the oligomer.

As noted hereinabove, the carbonylation oligomer which is the product of step A most often has an IV below about 0.10. Its degree of polymerization (DP) is generally below 10, with a value of about 6 being typical. In step B, said carbonylation oligomer is converted to a precursor polycarbonate oligomer. This is typically effected by melt polymerization, in the presence of a catalyst and a diaryl carbonate such as diphenyl carbonate to promote chain building by formation of aryloxy end groups as a result of reaction with the hydroxy end groups of the carbonylation oligomer. The molar ratio of diaryl carbonate to oligomers, based on molecules of oligomer present, is at least 1:1 and usually in the range of about 1–3:1.

Conventional catalysts may be employed in step B, as exemplified by tetraalkylammonium halides, tetraalkylphosphonium halides and the quaternary bisphenolates disclosed in U.S. Pat. No. 5,756,843, the disclosure of which is incorporated by reference herein. The quaternary bisphenolates are preferred, with the most preferred subgenus thereof being the hexaalkylguanidinium bisphenolates having the stoichiometric proportions of three hydrogen atoms, one hexaalkylguanidinium cation moiety and two bisphenol A dianion moieties as shown in the following formula wherein $R^5$ is an aliphatic group containing preferably 2–6 carbon atoms, and Ar is 2,2-bis(4-substituted phenyl)propane (i.e., HOArOH is bisphenol A):

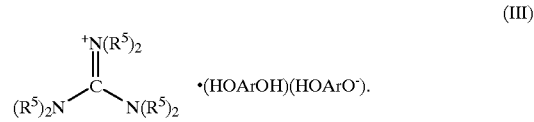

(III)

The hexaethylguanidinium salt of this description is hereinafter designated "HEG(BPA)$_2$". Conventional melt polymerization conditions, including progressively increasing temperatures in the range of about 150–250° C., and reduced pressures, may also be employed. An atmosphere of inert gas such as nitrogen or argon is preferred.

The precursor polycarbonate oligomer obtained in step B is an oligomer of higher molecular weight than that of step A, typically having an IV in the range of about 0.15–0.40. It also usually has a substantial degree of crystallinity, at least high enough for SSP to be conducted thereon without fusing of the polymer mass to the point where no molecular weight building takes place. By reason of the diaryl carbonate employed in its production, said product contains aryloxy end groups at a level sufficient for active SSP to take place.

In step C, the precursor polycarbonate oligomer obtained in step B is converted to high molecular weight polycarbonate. This may be achieved by melt polymerization or, preferably, by SSP.

The conditions of the melt polymerization or SSP of step C are typically conventional conditions for these reactions. These may include, in the case of melt polymerization, conditions such as those defined for step B. For SSP, the conditions may include progressively increased temperatures in the range of about 130–250° C. and the employment of an inert gas such as nitrogen or argon, frequently in such form that a fluidized bed of the polymer is formed.

A principal advantage of the invention as applied to SSP, however, is the fact that an intervening step of crystallinity enhancement is frequently not required, the precursor polycarbonate oligomer inherently having sufficient crystallinity to make SSP possible without such an intervening step. Demonstration of an adequate level of crystallinity for this purpose may be by the determination of a measurable melting temperature, Tm, for the oligomers.

The invention is illustrated by the following examples.

EXAMPLES 1–7

A stainless steel high pressure reactor equipped with gas and liquid sampling valves, temperature control and a turbine blade stirrer was charged with various proportions of bisphenol A, palladium(II) 2,4-pentanedionate, CoSMDPT, 2,2':6',2"-terpyridine, hexaethylguanidinium bromide (HEGBr) and toluene as a solvent; in Examples 7–8, NMP was also present. In Examples 2–5 molecular sieves (type 3A or 4A), were placed at the bottom of the reactor and covered with a polytetrafluoroethylene spacer.

The reactor was flushed twice with carbon monoxide at 13.6 atm and pressurized with carbon monoxide and oxygen, the oxygen comprising 7 mole percent of the gas mixture. The reactor was heated to 100° C. and stirring was commenced, with the progress of the carbonylation reaction being monitored by observing the pressure drop in the reactor. Reactor pressure was maintained as necessary by repressurizing with carbon monoxide and oxygen in a 2:1 volume ratio.

After the desired reaction time, the reactor was opened and the liquid phase removed. The residue remaining in the reactor was washed several times with warm toluene and the washings were combined with the liquid phase. Methanol was added to precipitate the carbonylation oligomer, which was removed by filtration, dried in vacuum and analyzed by infrared and proton nuclear magnetic resonance spectroscopy, differential scanning calorimetry and viscosity.

The results are given in the following table, in comparison with a control in which methanol was also present in the solvent system. The oligomer yield is given based on BPA.

| Example | 1 | 2 | 3 | 4 | 5 | 6 | 7 | Control |
|---|---|---|---|---|---|---|---|---|
| Bisphenol A, g | 2 | 2 | 2 | 20 | 20 | 20 | 20 | 2 |
| Pd(II) compound, mg | 30 | 30 | 30 | 140 | 280 | 280 | 280 | 29 |
| CoSMDPT, mg | 40 | 40 | 40 | 200 | 400 | 400 | 200 | 40 |
| Terpyridine, mg | 8 | 8 | 8 | 40 | 80 | 80 | 80 | 8 |
| HEGBr, mg | 340 | 340 | 340 | 1,700 | 3,400 | 3,400 | 3,400 | 340 |
| Toluene, ml | 18 | 18 | 18 | 180 | 180 | 160 | 160 | 13 |
| NMP, ml | — | — | — | — | — | 20 | 20 | — |
| molecular sieve, g | — | 3 | 3 | 35 | 35 | 35 | 35 | — |
| Methanol, ml | — | — | — | — | — | — | — | 5 |
| Total pressure, atm | 81.6 | 81.6 | 68.0 | 68.0 | 68.0 | 68.0 | 68.0 | 74.8 |
| Reaction time, hrs | 8 | 8 | 4 | 8 | 4 | 4 | 4 | 8 |
| Oligomer yield, % | 10.1 | 20.1 | 20.3 | 17.0 | 25.1 | 43.5 | 50.7 | 0 |
| Turnover number | 9 | 19 | 23 | 33 | 24 | 41 | 48 | 0 |

It is apparent from the table that significant yields of oligomer were obtained when toluene alone was used as a solvent, and even greater yields when a combination of toluene and NMP was used. By contrast, no oligomer could be precipitated when the solvent system also contained methanol. Higher yield of oligomer was obtained in the presence of molecular sieves.

EXAMPLE 8

A 100-ml 3-necked flask fitted with a nitrogen inlet, air-cooled condenser, thermowell and magnetic stirrer was charged with 832 mg of the carbonylation oligomers of Example 6, 361 mg of diphenyl carbonate (molar ratio of diphenyl carbonate to oligomers 2.1:1) and 50 ppm, based on oligomers, of HEG(BPA)$_2$. The flask was purged with nitrogen and heated in an oil bath to 180° C. for 1 hour, 200° C. for 1 hour and 220° C. for 30 minutes, all in a draft of nitrogen. The pressure in the flask was then reduced to 0.1 torr over 1 hour, with the temperature being maintained at 220° C. for 3 hours. The product was the desired precursor polycarbonate oligomer having an IV of 0.28 dl/g and a Tg of 126° C.

EXAMPLE 9

The procedure of Example 8 was repeated, using 628 mg of the carbonylation oligomers of Example 7 and 272 mg of diphenyl carbonate (molar ratio of diphenyl carbonate to oligomers 2.1: 1). The product was the desired precursor polycarbonate oligomer having an IV of 0.20 dl/g, a Tg of 118° C. and a Tm of 217° C.

EXAMPLE 10

The procedure of Example 9 was repeated, using 1,856 mg of the carbonylation oligomers of Example 7 and 499 mg of diphenyl carbonate (molar ratio of diphenyl carbonate to oligomers 2.1:1), and employing no catalyst. The product was the desired precursor polycarbonate oligomer having an IV of 0.20 dl/g, a Tg of 122° C. and a Tm of 220° C.

EXAMPLE 11

A 500-mg sample of the precursor polycarbonate oligomers of Example 9 was charged to a tubular glass reactor, fluidized with nitrogen (3 liters/min) and subjected to SSP at 150° C./45 min, 160° C./30 min, 180° C./30 min, 190° C./30 min, 200° C./60 min, 210C/60 min and 220° C./240 min. There was obtained a polycarbonate having an IV of 0.37 dl/g, a Tg of 136° C. and a Tm of 248° C.

EXAMPLE 12

The procedure of Example 8 was repeated, using 1.266 g of the carbonylation oligomer (BPA 145/6/7) and 0.981 g of diphenyl carbonate (molar ratio of diphenyl carbonate to oligomers 2.1:1). The produce was the desired precursor polycarbonate oligomer having an IV of 0.14 dL/g, and Tg of 107° C.

EXAMPLE 13

A 600 mg sample of precursor polycarbonate oligomers of Example 12 was charged to a tubular glass rector fluidized with nitrogen at 2 L per minute and subjected to SSP at 150°

C./30 min., 160° C./30 min., 180° C./30 min., 190° C./30 min., 200° C./60 min., 210° C./60 min., and 220° C. for 4 hours. There was obtained a polycarbonate having an IV of 0.3 dL/g, a Tg of 146° C., and a Tm of 245° C.

What is claimed is:

1. A method for preparing a polycarbonate oligomer composition which comprises contacting at least one dihydroxyaromatic compound with oxygen and carbon monoxide in the presence of an amount, effective for carbonylation, of at least one catalyst composition comprising:
    a Group VIII metal having an atomic number of at least 44, or a compound thereof;
    at least one organic or inorganic co-catalyst;
    at least one halide source; and
    an alcohol-free solvent comprising at least one liquid aromatic hydrocarbon.

2. A method according to claim 1 wherein the dihydroxyaromatic compound is bisphenol A.

3. A method according to claim 1 wherein the Group VIII metal is palladium.

4. A method according to claim 3 wherein both an inorganic and an organic co-catalyst are present.

5. A method according to claim 4 wherein the inorganic co-catalyst is a complex of a cobalt(II) salt with an organic compound capable of forming a complex therewith.

6. A method according to claim 5 wherein the inorganic co-catalyst is the cobalt(II) salt of bis[3-(salicylalamino)propyl]-methylamine.

7. A method according to claim 4 wherein the organic co-catalyst is a terpyridine, phenanthroline, quinoline or isoquinoline.

8. A method according to claim 7 wherein the organic co-catalyst is 2,2':6',2"-terpyridine.

9. A method according to claim 1 wherein the halide source is a quaternary ammonium bromide or quaternary phosphonium bromide or a hexaalkylguanidinium bromide.

10. A method according to claim 1 wherein the solvent is benzene, toluene, a xylene or a mixture of any of these.

11. A method according to claim 10 wherein the solvent is present in the amount of about 5–20 ml per gram of dihydroxyaromatic compound.

12. A method according to claim 10 wherein the solvent further contains a dipolar aprotic liquid.

13. A method according to claim 12 wherein the dipolar aprotic liquid comprises about 5–25% by volume of total solvent.

14. A method according to claim 12 wherein the dipolar aprotic liquid is N-methylpyrrolidinone.

15. A method according to claim 1 wherein the catalyst composition further comprises a drying agent.

16. A method for preparing a polycarbonate oligomer composition which comprises contacting at least one dihydroxyaromatic compound with oxygen and carbon monoxide in the presence of an amount, effective for carbonylation, of at least one catalyst composition including:
    palladium or a compound thereof;
    a co-catalyst comprising the cobalt(II) salt of bis[3-(salicylalamino)propyl]methylamine and 2,2':6',2"-terpyridine;
    a quaternary ammonium bromide or quaternary phosphonium bromide or a hexaalkylguanidinium bromide; and
    an alcohol-free solvent comprising toluene, optionally in combination with N-methylpyrrolidinone.

17. A method according to claim 16 wherein the catalyst composition further comprises molecular sieve drying agent.

18. A catalyst composition comprising:
    a Group VIII metal having an atomic number of at least 44, or a compound thereof;
    at least one organic or inorganic co-catalyst;
    at least one halide source; and
    an alcohol-free solvent comprising at least one liquid aromatic hydrocarbon.

19. A composition according to claim 18 wherein the Group VIII metal is palladium, the co-catalyst is a combination of the cobalt(II) salt of bis[3-(salicylalamino)propyl]methylamine and 2,2':6',2"-terpyridine, the halide source is a quaternary ammonium bromide or quaternary phosphonium bromide or a hexaalkyl-guanidinium bromide, and the solvent further comprises N-methylpyrrolidinone.

20. A composition according to claim 18 further comprising a drying agent.

21. A composition according to claim 20 wherein the drying agent comprises molecular sieves.

22. A method for preparing a high molecular weight aromatic polycarbonate which comprises:
    (A) preparing at least one carbonylation oligomer by oxidative carbonylation of at least one dihydroxyaromatic compound,
    (B) converting said carbonylation oligomer to a precursor polycarbonate oligomer by melt polymerization in the presence of at least one diaryl carbonate, and
    (C) polymerizing said precursor polycarbonate oligomer to a high molecular weight polycarbonate by melt polymerization or solid state polymerization.

23. A method according to claim 22 wherein step A is performed in the presence of a catalyst composition comprising:
    a Group VIII metal having an atomic number of at least 44, or a compound thereof;
    at least one organic or inorganic co-catalyst;
    at least one halide source; and
    an alcohol-free solvent comprising at least one liquid aromatic hydrocarbon.

24. A method according to claim 23 wherein step C comprises solid state polymerization.

25. A method according to claim 24 wherein steps B and C follow step A without an intervening step of crystallinity enhancement.

26. A method according to claim 24 wherein step B is performed in the presence of a catalyst which is a tetraalkylammonium halide, tetraalkylphosphonium halide or quaternary bisphenolate.

27. A method according to claim 26 wherein the catalyst in step B is a hexaalkylguanidinium bisphenolate having the stoichiometric proportions of three hydrogen atoms, one hexaalkyl-guanidinium cation moiety and two bisphenol A dianion moieties.

28. A method according to claim 23 wherein the catalyst composition further comprises a drying agent.

29. A method according to claim 28 wherein the drying agent comprises molecular sieves.

* * * * *